(12) United States Patent
Nezou et al.

(10) Patent No.: US 11,197,275 B2
(45) Date of Patent: Dec. 7, 2021

(54) COMMUNICATION METHODS, COMMUNICATION DEVICE STATION AND ACCESS POINT

(71) Applicant: CANON KABUSHIKI KAISHA, Tokyo (JP)

(72) Inventors: Patrice Nezou, Liffre (FR); Stéphane Baron, Le Rheu (FR); Pascal Viger, Janze (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/474,521

(22) PCT Filed: Jan. 5, 2018

(86) PCT No.: PCT/EP2018/050279
§ 371 (c)(1),
(2) Date: Jun. 27, 2019

(87) PCT Pub. No.: WO2018/130468
PCT Pub. Date: Jul. 19, 2018

(65) Prior Publication Data
US 2020/0029324 A1  Jan. 23, 2020

(30) Foreign Application Priority Data

Jan. 10, 2017  (GB) ..................... 1700429

(51) Int. Cl.
*H04W 4/00* (2018.01)
*H04W 72/04* (2009.01)
(Continued)

(52) U.S. Cl.
CPC ....... *H04W 72/0413* (2013.01); *H04L 1/1685* (2013.01); *H04L 5/0094* (2013.01); *H04W 74/0833* (2013.01)

(58) Field of Classification Search
USPC .................. 370/328, 329, 330, 331; 455/434
See application file for complete search history.

(56) References Cited

U.S. PATENT DOCUMENTS 9,467,898 B2 * 10/2016 Kwon .................. H04W 74/006
9,887,821 B2 *  2/2018 Seok .................. H04W 52/0216
(Continued)

FOREIGN PATENT DOCUMENTS

| CN | 101208891 A | 6/2008 |
| CN | 103947263 A | 7/2014 |

(Continued)

*Primary Examiner* — David Q Nguyen
(74) *Attorney, Agent, or Firm* — Canon U.S.A., Inc. IP Division

(57) ABSTRACT

The present invention provides a new trigger frame dedicated to NDP feedback procedure. This NDP feedback trigger frame comprises a specific field allowing stations (non-AP nodes) receiving this trigger frame to identify it as being a dedicated NDP feedback trigger frame. Thanks to this specific field, a receiving station knows that a NDP feedback procedure has started and that a NDP feedback is expected by the access point. The present invention also provides for communication methods using this NDP feedback trigger frame, communication device station and access point configured to implement these methods, and also a wireless communication network comprising such devices.

12 Claims, 8 Drawing Sheets

(51) Int. Cl.
*H04L 1/16* (2006.01)
*H04L 5/00* (2006.01)
*H04W 74/08* (2009.01)

(56) References Cited

U.S. PATENT DOCUMENTS

| | | | |
|---|---|---|---|
| 2015/0085777 A1 | 3/2015 | Seok | |
| 2015/0208436 A1* | 7/2015 | Seok | H04W 74/08 370/329 |
| 2016/0143026 A1* | 5/2016 | Seok | H04W 72/046 370/329 |
| 2016/0233932 A1* | 8/2016 | Hedayat | H04L 5/0048 |
| 2016/0261327 A1* | 9/2016 | Merlin | H04W 72/0413 |
| 2016/0330732 A1* | 11/2016 | Moon | H04B 7/0617 |
| 2016/0359653 A1* | 12/2016 | Lee | H04W 74/085 |
| 2018/0014334 A1 | 1/2018 | Ahn et al. | |
| 2018/0054240 A1* | 2/2018 | Cariou | H04B 7/2612 |
| 2018/0092107 A1* | 3/2018 | Cariou | H04W 52/0225 |
| 2018/0205441 A1* | 7/2018 | Asterjadhi | H04B 7/0626 |
| 2019/0089424 A1* | 3/2019 | Cariou | H04W 74/06 |
| 2020/0029236 A1* | 1/2020 | Segev | H04W 88/06 |
| 2021/0084635 A1* | 3/2021 | Oteri | H04L 5/0055 |

FOREIGN PATENT DOCUMENTS

| | | | |
|---|---|---|---|
| CN | 104255068 A | 12/2014 | |
| WO | 2016/129979 A1 | 8/2016 | |
| WO | WO-2018071105 A1 * | 4/2018 | H04W 74/06 |

* cited by examiner

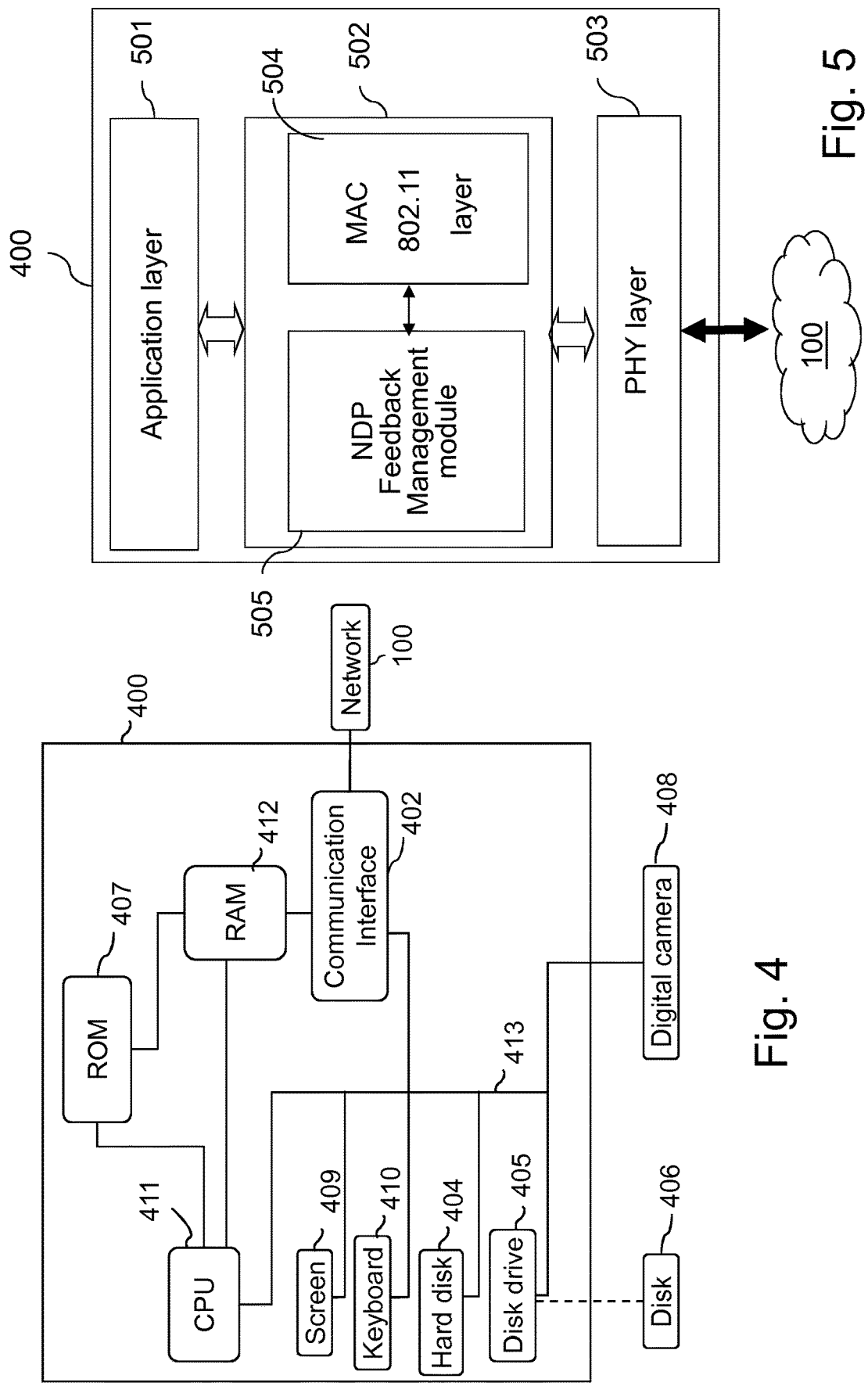

COMMUNICATION METHODS, COMMUNICATION DEVICE STATION AND ACCESS POINT

This application is the National Phase application of PCT Application No. PCT/EP2018/050279, filed on Jan. 5, 2018 and titled "Communication Methods, Communication Device Station and Access Point." This application claims the benefit under 35 U.S.C. § 119(a)-(d) of United Kingdom Patent Application Nos. GB 1700429.2, filed on Jan. 10, 2017. The above cited patent applications are incorporated herein by reference in their entirety.

FIELD OF THE INVENTION

The present invention relates generally to communication networks and more specifically to communication networks offering channel accesses to nodes through contention and providing secondary accesses to the nodes to sub-channels (or Resource Units) splitting a transmission opportunity TXOP granted to an access point, in order to transmit data.

The invention finds application in wireless communication networks, in particular in 802.11ax networks offering, to the nodes, an access to an 802.11ax composite channel and/or to Resource Units forming for instance an 802.11ax composite channel granted to the access point and allowing Uplink communication to be performed.

BACKGROUND OF THE INVENTION

The IEEE 802.11 MAC standard defines the way Wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

The 802.11 medium access protocol standard or operating mode is mainly directed to the management of communication stations waiting for the wireless medium to become idle so as to try to access to the wireless medium.

The network operating mode defined by the IEEE 802.11ac standard provides very high throughput (VHT) by, among other means, moving from the 2.4 GHz band which is deemed to be highly susceptible to interference to the 5 GHz band, thereby allowing for wider frequency contiguous channels of 80 MHz to be used, two of which may optionally be combined to get a 160 MHz channel as operating band of the wireless network.

The 802.11ac standard also tweaks control frames such as the Request-To-Send (RTS) and Clear-To-Send (CTS) frames to allow for composite channels of varying and predefined bandwidths of 20, 40 or 80 MHz, the composite channels being made of one or more communication channels that are contiguous within the operating band. The 160 MHz composite channel is possible by the combination of two 80 MHz composite channels within the 160 MHz operating band. The control frames specify the channel width (bandwidth) for the targeted composite channel.

A composite channel therefore consists of a primary channel on which a given node performs EDCA backoff procedure to access the medium, and of at least one secondary channel, of for example 20 MHz each.

EDCA (Enhanced Distributed Channel Access) defines traffic categories and four corresponding access categories that make it possible to handle differently high-priority traffic compared to low-priority traffic.

Implementation of EDCA in the nodes can be made using a plurality of traffic queues (known as "Access Categories") for serving data traffic at different priorities, each traffic queue being associated with a respective queue backoff value. The queue backoff value is computed from respective queue contention parameters, e.g. EDCA parameters, and is used to contend for access to a communication channel in order to transmit data stored in the traffic queue.

Conventional EDCA parameters include CWmin, CWmax and AIFSN for each traffic queue, wherein CWmin and CWmax are the lower and higher boundaries of a selection range from which an EDCA contention window CW is selected for a given traffic queue. AIFSN stands for Arbitration Inter-Frame Space Number, and defines the number of time slots (usually 9 µs), additional to a DIFS interval (the total defining the AIFS period) the node must sense the medium as idle before decrementing the queue backoff value associated with the traffic queue considered.

The EDCA parameters may be defined in a beacon frame sent by a specific node in the network to broadcast network information.

The contention windows CW and the queue backoff values are EDCA variables.

Conventional EDCA backoff procedure consists for the node in selecting a queue backoff value for a traffic queue from the respective contention window CW, and then to decrement it upon sensing the medium as idle after the AIFS period. Once the backoff value reaches zero, the node is allowed to access the medium.

The EDCA queue backoff values or counters thus play two roles. First, they drive the nodes in efficiently accessing the medium, by reducing risks of collisions; second, they offer management of quality of service, QoS, by mirroring the aging of the data contained in the traffic queue (the more aged the data, the lower the backoff value) and thus providing different priorities to the traffic queues through different values of the EDCA parameters (especially the AIFSN parameter that delays the start of the decrementing of the EDCA queue backoff values).

Thanks to the EDCA backoff procedure, the node can thus access the communication network using contention type access mechanism based on the queue contention parameters, typically based on the computed queue backoff counter or value.

The primary channel is used by the communication nodes to sense whether or not the channel is idle, and the primary channel can be extended using the secondary channel or channels to form a composite channel. The primary channel can also be used alone.

Given a tree breakdown of the operating band into elementary 20 MHz channels, some secondary channels are named tertiary or quaternary channels.

In 802.11ac, all the transmissions, and thus the possible composite channels, include the primary channel. This is because the nodes perform full Carrier Sense Multiple Access/Collision Avoidance (CSMA/CA) and Network Allocation Vector (NAV) tracking on the primary channel only. The other channels are assigned as secondary channels, on which the nodes have only capability of CCA (clear channel assessment), i.e. detection of an idle or busy state/status of said secondary channel. An issue with the use of composite channels as defined in the 802.11n or 802.11ac (or 802.11ax) standards is that the nodes compliant with a use of composite channels (i.e. 802.11n-compliant node (already known as HT nodes standing for High Throughput nodes), 802.11ac-compliant nodes (already known as VHT nodes standing Very High Throughput nodes) and 802.11ax-compliant nodes (already known as HE nodes standing High Efficiency nodes)) have to co-exist with legacy nodes not able to use composite channels but relying only on conventional 20 MHz channels (i.e. non-HT nodes compliant only with for instance 802.11a/b/g).

To cope with this issue, the 802.11n and 802.11ac and 802.11ax standards provide the possibility to duplicate control frames (e.g. RTS/CTS or CTS-to-Self or ACK frames to acknowledge correct or erroneous reception of the sent data) over each 20 MHz channel in an 802.11a legacy format (called as "non-HT") to establish a protection of the requested TXOP over the whole composite channel.

This is for any legacy 802.11a node that uses any of the 20 MHz channel involved in the composite channel to be aware of on-going communications on the 20 MHz channel. As a result, the legacy node is prevented from initiating a new transmission until the end of the current composite channel TXOP granted to an 802.11n/ac/ax node.

20 MHz non-HT control frames to be sent simultaneously on both the primary and secondary channels forming the used composite channel.

This approach has been widened for 802.11ac to allow duplication over the channels forming an 80 MHz or 160 MHz composite channel. In the remainder of the present document, the "duplicated non-HT frame" or "duplicated non-HT control frame" or "duplicated control frame" means that the node device duplicates the conventional or "non-HT" transmission of a given control frame over secondary 20 MHz channel(s) of the (40 MHz, 80 MHz or 160 MHz) operating band.

In practice, to request a composite channel (equal to or greater than 40 MHz) for a new TXOP, an 802.11n/ac node performs an EDCA backoff procedure in the primary 20 MHz channel as mentioned above. In parallel, it performs a channel sensing mechanism, such as a Clear-Channel-Assessment (CCA) signal detection, on the secondary channels to detect the secondary channel or channels that are idle (channel state/status is "idle") during a PIFS interval before the start of the new TXOP (i.e. before any queue backoff counter expires).

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

Recent developments in the 802.11ax standard sought to optimize usage of the composite channel by multiple nodes in a wireless network having an access point (AP). Indeed, typical contents have important amount of data, for instance relating to high-definition audio-visual real-time and interactive content. Furthermore, it is well-known that the performance of the CSMA/CA protocol used in the IEEE 802.11 standard deteriorates rapidly as the number of nodes and the amount of traffic increase, i.e. in dense WLAN scenarios.

In this context, multi-user (MU) transmission has been considered to allow multiple simultaneous transmissions to/from different users in both downlink (DL) and uplink (UL) directions from/to the AP and during a transmission opportunity granted to the AP. In the uplink, multi-user transmissions can be used to mitigate the collision probability by allowing multiple non-AP stations or non-AP nodes to simultaneously transmit. In the following document, we refer to non-AP nodes as "stations" or STA, by opposition to AP nodes.

To actually perform such multi-user transmission, it has been proposed to split a granted communication channel into sub-channels, also referred to as resource units (RUs), that are shared in the frequency domain by multiple users (non-AP stations/nodes), based for instance on Orthogonal Frequency Division Multiple Access (OFDMA) technique. Each RU may be defined by a number of tones, the 80 MHz channel containing up to 996 usable tones.

OFDMA is a multi-user variation of OFDM which has emerged as a new key technology to improve efficiency in advanced infrastructure-based wireless networks. It combines OFDM on the physical layer with Frequency Division Multiple Access (FDMA) on the MAC layer, allowing different subcarriers to be assigned to different stations/nodes in order to increase concurrency. Adjacent sub-carriers often experience similar channel conditions and are thus grouped to sub-channels: an OFDMA sub-channel or RU is thus a set of sub-carriers.

As currently envisaged, the granularity of such OFDMA sub-channels is finer than the original 20 MHz channel band. Typically, a 2 MHz or 5 MHz sub-channel may be contemplated as a minimum width, therefore defining for instance 9 sub-channels or resource units within a single 20 MHz channel.

The multi-user feature of OFDMA allows the AP to assign or offer different RUs to different non-AP stations/nodes in order to increase competition. This may help to reduce contention and collisions inside 802.11 networks.

The 802.11ax standard defines a Trigger frame (TF) that is sent by the AP to the 802.11ax non-AP nodes (i.e. to the 802.11ax stations) to trigger Multi-User uplink communications, i.e. solicit the transmission of uplink (UL) Multi-User (OFDMA) PPDU from multiple nodes. The TF defines the resource units as provided by the AP to the nodes. In response, the nodes transmit UL MU (OFDMA) PPDU as immediate responses to the Trigger frame. All transmitters can send data at the same time, but using disjoint sets of RUs (i.e. of frequencies in the OFDMA scheme), resulting in transmissions with less interference.

The width of the targeted composite channel is signalled in the TF frame, meaning that the 20, 40, 80 or 160 MHz value is added. The TF frame is sent over the primary 20 MHz channel and duplicated (replicated) on each other 20 MHz channels forming the targeted composite channel, if appropriate. As described above for the duplication of control frames, it is expected that every nearby legacy node (non-802.11ax nodes) receiving the TF on its primary channel, then sets its NAV to the value specified in the TF. This prevents these legacy nodes from accessing the channels of the targeted composite channel during the TXOP.

A resource unit RU can be reserved for a specific node, in which case the AP indicates, in the TF, the node to which the RU is reserved. Such RU is called Scheduled RU. The indicated node does not need to perform contention on accessing a scheduled RU reserved to it.

In order to better improve the efficiency of the system with regards to unmanaged traffic to the AP (for example, uplink management frames from associated nodes, unassociated nodes intending to reach an AP, or simply unmanaged data traffic), resource units may be proposed by the AP to the 802.11ax nodes through contention-based access. In other words, the resource unit RU can be randomly accessed by more than one node. Such RU is called Random RU and is indicated as such in the TF. Random RUs may serve as a basis for contention between nodes willing to access the communication medium for sending data.

As readily apparent from the above, the Multi User Uplink medium access scheme (or RU access scheme) allows the number of collisions generated by simultaneous medium access attempts to be reduced, while also reducing the overhead due to the medium access since the medium access cost is shared between several nodes.

In a dense environment such as in a network compliant with the 802.11ax standard, bandwidth consumption rate and all extra overheads are important matters. In order to optimize bandwidth consumption, the access point (AP) aims at controlling the access to the medium by managing grant of RUs to the non-AP stations (STA). To optimize resource units (RUs) allocation, the AP preferably has a global view of the nodes requirements as precisely as possible. A problem is that the AP does not know when new bursts arrive in STAs buffer (small packets, or first packets of a longer burst of data).

The 802.11ax standard provides a mechanism for polling all STAs of the 802.11ax cell to get the status of data queues. This mechanism (called "BSR (for Buffer Status Report) mechanism") consists in sending a dedicated BSR trigger frame soliciting each node to answer with a buffer status report packet as described in the 802.11ax standard (see Draft 1.0—Clause 27.5.2.5).

One single node is solicited at a time. This may be problematic in huge environments (typically in a 802.11ax cell driving a high number of IOT devices for Internet Of Things) as the AP has to send multiple BSR trigger frames to solicit all STAs of the 802.11ax cell, even if only a few number of STAs have some remaining data packets to be transmitted in its queues. Thus, bandwidth is consumed for no real impact for future transmissions since all STAs are polled while only few responses matter.

Moreover, the trigger frame uses the same medium access scheme as a single data packet. It means that some other transmissions can be performed by other STAs between BSR trigger frames. As a consequence, the result of the BSR mechanism may be obsolete when all STAs are finally polled about their future data transmissions.

To address these bandwidth and obsolescence issues, the clause 27.5.2.7 of the draft 1.0 of the 802.11ax standard proposes an additional mechanism called NDP (Null Data Packet) feedback report procedure. The NDP packet is a single packet with no data payload and thus allows building very short responses. In sounding protocols, it allows adapting beamforming antenna for multiple STAs in an 802.11 cell in cost effective manner.

The NDP feedback procedure has a low and stable latency compared to possibly high and unpredictable latency with conventional CSMA-CA mechanisms when used in dense environments.

A problem is that no implementation for the NDP feedback procedure is proposed in the 802.11ax standard. There is thus a need to provide a complete mechanism defining the NDP feedback mechanism.

SUMMARY OF INVENTION

The present invention has been devised to address one or more of the foregoing concerns.

In this context, according to a first aspect of the invention, there is provided a communication method in a wireless communication network comprising an access point (AP) and a plurality of stations (non-AP), the method comprising, at the access point:

accessing a communication channel to send a trigger frame reserving a transmission opportunity on the communication channel and defining resource units, RUs, forming the communication channel for the stations to transmit data to the access point;

wherein the trigger frame comprises a first field allowing stations receiving it to identify the trigger frame as being dedicated to initiate collection of feedbacks from stations of the plurality during the reserved transmission opportunity.

Typically, this first field is a "Trigger Type" field having a value specific to the NDP feedback procedure as mentioned below.

The claimed invention thus provides an implementation of a NDP feedback mechanism using a specific NDP feedback trigger frame enabling to retrieve short feedbacks from a very high number of communication nodes in a dense 802.11 environment.

Thanks to the specific NDP feedback trigger frame, the access point is better aware of the state of the nodes, i.e. has a better global and more accurate (in real time) view of the nodes requirements (e.g. resource requests) and abilities (e.g. low/high level of battery) without this causing overloads or excessive latencies due to very short NDP feedback responses.

Advantageously, a better control of the access to the medium by better managing grant of RUs to the nodes (non-AP stations) is achieved. Hence, bandwidth occupancy is better optimized compared to the prior art.

Correspondingly, there is provided an access point (AP) in a wireless communication network also comprising a plurality of stations (non-AP), the access point comprising at least one microprocessor configured for carrying out the following step:

accessing a communication channel to send a trigger frame reserving a transmission opportunity on the communication channel and defining resource units, RUs, forming the communication channel for the stations to transmit data to the access point;

wherein the trigger frame comprises a first field allowing stations receiving it to identify the trigger frame as being dedicated to initiate collection of feedbacks from stations of the plurality during the reserved transmission opportunity.

The access point has the same advantages as the method defined above.

Optional features of the invention are further defined in the dependent appended claims. Some of these features are explained here below with reference to a method, while they can be transposed into device features dedicated to an access point according to the invention.

According to embodiments, the trigger frame comprises a second field indicating a type of feedbacks to be collected from the stations.

Advantageously, any type requesting a few bits answer only can be asked in the NDP feedback trigger frame. In this way, the initial usage (resource feedbacks) of the NDP feedback procedure may be advantageously extended to various types. For instance, the type may relate to the battery level of the mobile stations or the temperature level of IOT (Internet Of Things) devices.

This second field is typically a "Service Info" field as described below and the type is typically indicated in the "Question" subfield of this "Service Info" field as described below.

According to embodiments, the feedback response is received by the access point in a packet with no data payload.

According to embodiments, the type calls for resource requests from the stations. It avoids reserving and loosing resource units for stations that have no data to transmit.

According to embodiments, the type is about the status of at least one component of the station.

Many IOT devices can be polled for avoiding multiple medium accesses from IOT devices when they have very short data packets to transmit. Finally the bandwidth consumption is optimized.

According to embodiments, the type is a closed-ended question.

Such a closed-ended question allows analyzing the received NDP feedback packet using a single energy detection mechanism. The access point can thus optimize the time to analyze all the received NDP feedback packets.

According to embodiments, the trigger frame comprises information indicating a group of stations to be polled by the access point.

According to embodiments, the second field comprises a subfield indicating a group of stations to be polled by the access point. This subfield is typically a "ClientID" field as described below.

It allows selecting a group of stations without extra overhead. When stations are divided into multiple groups, it allows minimizing the size of the "Map Info" field mentioned below or extending the "Map Info" field mentioned below when its size is limited.

According to embodiments, the trigger frame comprises a third field specifying the position at which a feedback responsive to the trigger frame should be sent. This third field is typically a "Map Info" field as described below.

This third field may comprise a feedback map specifying, for each selected station, the position at which a feedback responsive to the trigger frame should be sent.

A polled station can thus determine the exact position where to send its NDP feedback packet without any collision with the other polled stations.

According to embodiments, the third field comprises at least one station identifier and at least one RU number.

According to embodiments, the third field also comprises a time position and/or a spatial position.

The number of polled stations for one NDP feedback trigger frame is thus increased and the extra overhead is minimized.

According to embodiments, the method comprises the following steps:
selecting a service;
selecting at least one station to be polled about the selected service;
building the trigger frame based on the selected service and an identifier of the at least one station to be polled.

According to embodiments, the method also comprises building a feedback map for the selected station(s), the feedback map specifying, for each selected station, the position at which a feedback responsive to the trigger frame should be sent, and building the trigger frame is also based on the feedback map.

According to embodiments, the method also comprises gathering the selected stations having MIMO capabilities in a first group and the selected stations without MIMO capabilities in a second group, and building a feedback map is based on the first and the second group.

According to embodiments, the method also comprises the following steps:
receiving at least one feedback response to the trigger frame;
analyzing the received feedback response(s).

According to embodiments, analyzing uses a single energy detection mechanism.

According to a second aspect of the invention, there is provided a communication method in a wireless communication network comprising an access point (AP) and a plurality of stations (non-AP), the method comprising, at a station:
receiving a trigger frame reserving a transmission opportunity on the communication channel and defining resource units, RUs, forming the communication channel for the stations to transmit data to the access point;
wherein the trigger frame comprises a first field allowing the station to identify the trigger frame as being dedicated to initiate collection of feedbacks from stations of the plurality during the reserved transmission opportunity.

Thus, when receiving a trigger frame, the station knows that it is a NDP feedback trigger frame. The station thus knows that a NDP feedback process is being performed on the communication channel and that a NDP feedback procedure has started and that a NDP feedback is expected by the access point.

Correspondingly, there is provided communication device station in a wireless communication network comprising an access point (AP) and a plurality of stations (non-AP), the communication device comprising at least one microprocessor configured for carrying out the following step:
receiving a trigger frame reserving a transmission opportunity on the communication channel and defining resource units, RUs, forming the communication channel for the stations to transmit data to the access point;
wherein the trigger frame comprises a first field allowing the station to identify the trigger frame as being dedicated to initiate collection of feedbacks from stations of the plurality during the reserved transmission opportunity; and wherein the trigger frame further comprises a second field indicating a type of feedbacks to be collected from the stations.

The communication device station has the same advantages as the method defined above.

Optional features of the invention are further defined in the dependent appended claims. Some of these features are explained here below with reference to a method, while they can be transposed into device features dedicated to any communication device station according to the invention.

According to embodiments, the method also comprises the following steps:
determining whether the station is targeted by the received trigger frame; and if so:
building a feedback response to the received trigger frame; and
sending the feedback response to the access point in the transmission opportunity reserved by the access point.

According to embodiments, the feedback response is sent in a packet with no data payload, i.e. a null data packet (NDP).

According to embodiments, the method also comprises identifying, based on the received trigger frame, a position at which a feedback response to it should be sent, and sending the feedback response to the access point is done at the identified position.

This position is typically indicated in a feedback map of a "Map Info" field as described below. This feedback map specifies, for each station targeted in the trigger frame, the position at which a feedback responsive to the trigger frame should be sent.

Hence, collisions between NDP feedback packets are avoided.

According to embodiments, the method also comprises the following steps:

retrieving, based on the second field in the received trigger frame, a type of feedbacks to be collected from the stations; and determining the response to the type;

and the feedback response is built based on the determined response.

The type is typically indicated in the "Question" subfield of a "Service Info" field as described below.

Advantageously, since a wide variety of types may be asked the polled station is not limited to send resource feedbacks but can send other kinds of feedbacks depending on the type asked. For instance, the polled station may provide feedbacks about its battery level or its temperature level.

According to embodiments, the type is a closed-ended question.

Such a closed-ended question is easy to answer for the communication device station and allows the access point to analyze the received NDP feedback packet using a single energy detection mechanism.

According to a third aspect of the invention, there is a provided wireless communication network comprising a plurality of communication device stations as aforementioned and an access point as aforementioned.

According to a fourth aspect of the invention, there is provided a dedicated Null Data Packet (NDP) feedback trigger frame designed to be sent by an access point (AP) of a wireless communication network comprising a plurality of stations (non-AP), the NDP feedback trigger frame comprising a second field indicating a type of feedbacks to be collected from the stations.

This trigger frame dedicated to the NDP feedback procedure comprises a specific field allowing stations (non-AP nodes) receiving this trigger frame to identify it as being a dedicated NDP feedback trigger frame. Thanks to this specific field, a receiving station knows that a NDP feedback procedure has started and that a NDP feedback is expected by the access point.

The type is typically indicated in the "Question" subfield of a "Service Info" field as described below.

Advantageously, any type requesting a few bits answer only can be asked in the NDP feedback trigger frame. In this way, the initial usage (resource feedbacks) of the NDP feedback procedure may be advantageously extended to various questions. For instance, the type may relate to the battery level of the mobile stations or the temperature level of IOT (Internet Of Things) devices.

According to embodiments, the type calls for resource requests from stations able to receive the NDP feedback trigger frame.

It avoids reserving and loosing resource units for stations that have no data to transmit.

According to embodiments, the type is about the status of at least one component of a station able to receive the NDP feedback trigger frame.

According to embodiments, the type is a closed-ended question.

Such a closed-ended question is easy to answer for the communication device station and allows the access point to analyze the received NDP feedback packet using a single energy detection mechanism. Furthermore, the access point can thus optimize the time to analyze all the received NDP feedback packets.

According to embodiments, the trigger frame comprises information indicating the group of stations to be polled.

According to embodiments, the second field comprises a subfield indicating a group of stations to be polled. This subfield is typically a "ClientID" field as described below.

It allows selecting a group of stations without extra overhead. When stations are divided into multiple groups, it allows minimizing the size of the "Map Info" field mentioned below or extending the "Map Info" field mentioned below when its size is limited.

According to embodiments, the trigger frame comprises a third field specifying the position at which a feedback responsive to the NDP feedback trigger frame should be sent.

This third field is typically a "Map Info" field as described below.

It may comprise a feedback map specifying, for each polled station, the position at which a feedback responsive to the trigger frame should be sent.

A given polled station can thus determine the exact position where to send its NDP feedback packet without any collision with the other polled stations.

According to embodiments, the third field comprises at least one station identifier and at least one RU number.

According to embodiments, the third field also comprises a time position and/or a spatial position.

The number of polled stations for one NDP feedback trigger frame is thus increased and the extra overhead is minimized.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the methods and devices.

Other aspects of the invention relates to method, substantially as herein described with reference to, and as shown in, FIGS. 9 and 10 of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 4 shows a schematic representation a communication device or station according to embodiments of the present invention;

FIG. 5 shows a block diagram schematically illustrating the architecture of a wireless communication device according to embodiments of the present invention;

DETAILED DESCRIPTION

The invention will now be described by means of specific non-limiting exemplary embodiments and by reference to the figures.

Figure 1:
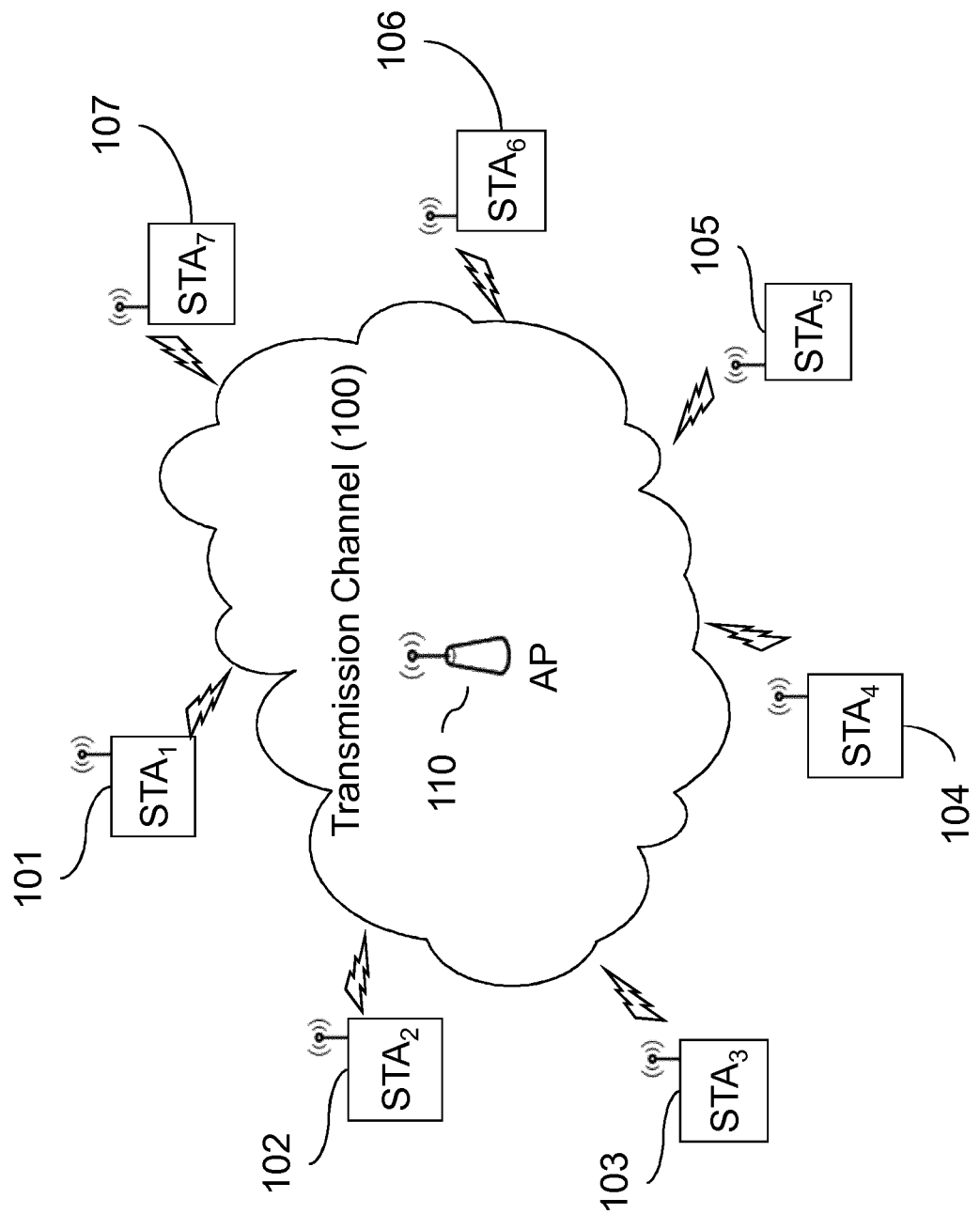
FIG. 1 illustrates a typical wireless communication system in which embodiments of the invention may be implemented.

FIG. 1 illustrates a communication system in which several communication nodes (or stations) 101, 102, 103, 104, 105, 106 and 107 exchange data frames over a radio transmission channel 100 of a wireless local area network (WLAN), under the management of a central station, or access point (AP) 110 with which the nodes have registered. The radio transmission channel 100 is defined by an operating frequency band constituted by a single channel or a plurality of channels forming a composite channel.

Access to the shared radio medium to send data frames is based on the CSMA/CA technique, for sensing the carrier and avoiding collision by separating concurrent transmissions in space and time.

To meet the ever-increasing demand for faster wireless networks to support bandwidth-intensive applications, 802.11ac is targeting larger bandwidth transmission through multi-channel operations.

Figure 2:
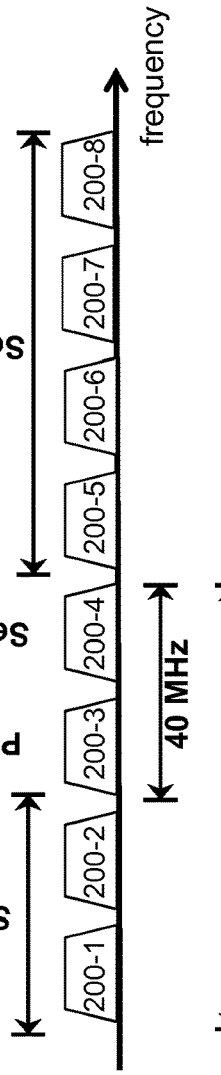
FIG. 2 illustrates 802.11ac channel allocation that supports channel bandwidths of 20 MHz, 40 MHz, 80 MHz or 160 MHz as known in the art.

FIG. 2 illustrates 802.11ac channel allocation that supports channel bandwidths of 20 MHz, 40 MHz, 80 MHz or 160 MHz as known in the art.

IEEE 802.11ac introduces support of a restricted number of predefined subsets of 20 MHz channels to form the sole predefined composite channel configurations that are available for reservation by any 802.11ac node on the wireless network to transmit data.

The predefined subsets are shown in the figure and correspond to 20 MHz, 40 MHz, 80 MHz, and 160 MHz channel bandwidths, compared to only 20 MHz and 40 MHz supported by 802.11n. Indeed, the 20 MHz component channels 300-1 to 300-8 are concatenated to form wider communication composite channels.

In the 802.11ac standard, the channels of each predefined 40 MHz, 80 MHz or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency-adjacent or contiguous 40 MHz and 20 MHz channels, respectively. However the present invention may have embodiments with either composition of the channel bandwidth, i.e. including only contiguous channels or formed of non-contiguous channels within the operating band.

A node is granted a TXOP through the enhanced distributed channel access (EDCA) mechanism on the "primary channel" (200-3). Indeed, for each composite channel having a bandwidth, 802.11ac designates one channel as "primary" meaning that it is used for contending for access to the composite channel. The primary 20 MHz channel is common to all nodes (STAs) belonging to the same basic set, i.e. managed by or registered with the same local Access Point (AP).

However, to make sure that no other legacy node (i.e. not belonging to the same 802.11 network or cell) uses the secondary channels, it is provided that the control frames (e.g. RTS frame/CTS frame) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user (MU) transmission features, allowing multiple simultaneous transmissions to/from different users in both downlink (DL) and uplink (UL) directions with a main node, usually an AP. In the uplink, multi-user transmissions can be used to mitigate the collision probability by allowing multiple nodes to simultaneously transmit to the AP.

As illustrated with reference to FIG. 3, to actually perform such multi-user transmission, it has been proposed to split a granted 20 MHz channel into sub-channels (elementary sub-channels), also referred to as sub-carriers or resource units (RUs), that are shared in the frequency domain by multiple users, based for instance on Orthogonal Frequency Division Multiple Access (OFDMA) technique.

In the given example, each 20 MHz channel 300-1, 300-2, 300-3 or 300-4 is sub-divided in the frequency domain into four sub-channels or RUs 310, typically of size 5 MHz.

Of course the number of RUs splitting a 20 MHz channel may be different from four. For instance, between two to nine RUs may be provided (thus each having a size between 10 MHz and about 2 MHz).

The multi-user feature of OFDMA allows, a node, usually an access point, AP, to assign different RUs to different nodes in order to increase competition. This may help to reduce contention and collisions inside 802.11 networks.

Contrary to MU downlink OFDMA wherein the AP can directly send multiple data to multiple nodes (supported by specific indications inside the PLOP header), a trigger mechanism has been adopted for the AP to trigger MU uplink communications from various nodes.

To support a MU uplink transmission (during a TxOP pre-empted by the AP), the 802.11ax AP has to provide signalling information for both legacy nodes (non-802.11ax nodes) to set their NAV and for 802.11ax nodes to determine the Resource Units allocation.

In the following description, the term legacy refers to non-802.11ax nodes, meaning 802.11 nodes of previous technologies that do not support OFDMA communications.

Figure 3:
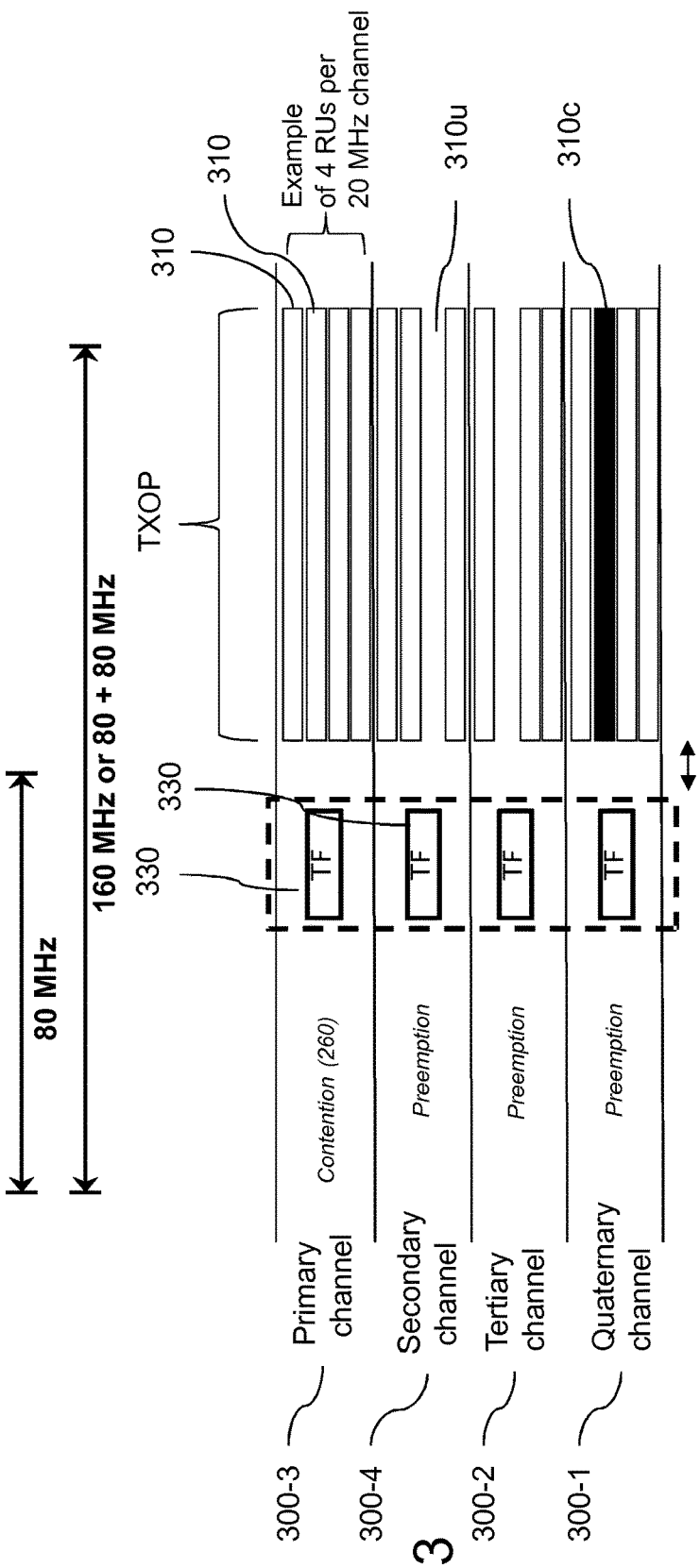
FIG. 3 illustrates an example of 802.11ax uplink OFDMA transmission scheme, wherein the AP issues a trigger frame for reserving a transmission opportunity of OFDMA subchannels (resource units) on an 80 MHz channel as known in the art.

As shown in the example of FIG. 3, the AP sends a trigger frame (TF) 330 to the targeted 802.11ax nodes. The bandwidth or width of the targeted composite channel is signalled in the TF frame, meaning that the 20, 40, 80 or 160 MHz value is signalled. The TF frame is sent over the primary 20 MHz channel and duplicated (replicated) on each other 20 MHz channels forming the targeted composite channel. As described above for the duplication of control frames, it is expected that every nearby legacy node (non-HT or 802.11ac nodes) receiving the TF frame (or a duplicate thereof) on its primary channel, then sets its NAV to the value specified in the TF frame. This prevents these legacy nodes from accessing the channels of the targeted composite channel during the TXOP.

Based on an AP's decision, the trigger frame TF may define a plurality of resource units (RUs) 310. These RUs can be scheduled RU or "Random RUs".

Scheduled RUs may be reserved by the AP for certain nodes in which case no contention for accessing such RUs is needed for these nodes. Such RUs and their corresponding scheduled nodes are indicated in the trigger frame. For instance, a node identifier, such as the Association ID (AID) assigned to each node upon registration, is added, in the TF frame, in association with each Scheduled RU in order to explicitly indicate the node that is allowed to use each Scheduled RU.

Random RUs can be randomly accessed by the nodes of the network. In other words, Random RUs designated or allocated by the AP in the TF may serve as basis for contention between nodes willing to access the communication medium for sending data. A collision occurs when two or more nodes attempt to transmit at the same time over the same RU. An AID equal to 0 may be used to identify random RUs.

The trigger frame containing only random RUs is referred to as a trigger frame for random access (TF-R). A TF-R may be emitted by the AP to allow multiple nodes to perform MU UL (Multi-User UpLink) random access to obtain an RU for their UL transmissions.

The AP can assign only one scheduled RU per non-AP STA and random RU can be accessed by non-AP STA that are not polled by scheduled RUs in the same TF. This may help to reduce contention and collisions inside 802.11 networks.

Once the nodes have used the RUs to transmit data to the AP, the AP responds with an acknowledgment ACK (not show in the figure) to acknowledge the data on each RU, making it possible for each node to know when its data transmission is successful (reception of the ACK) or not (no ACK after expiry of a time-out).

Document IEEE 802.11-15/1105 provides an exemplary random allocation procedure that may be used by the nodes to access the Random RUs indicated in the TF. This random allocation procedure, referred to as RU contention scheme, is managed by a dedicated RU access module separate from the above-mentioned channel access module and is configured to manage access to at least one resource unit provided by another node (usually the AP) within a transmission opportunity granted to the other node on the communication channel, in order to transmit data stored locally over an accessed resource unit. Preferably, the RU access module includes an RU backoff engine separate from the queue backoff engines, which uses RU contention parameters, including a computed RU backoff value, to contend for access to the random RUs.

In other words, the RU contention scheme is based on a new backoff counter, referred to as the OFDMA or RU backoff counter/value (or OBO), inside the 802.11ax nodes for allowing a dedicated contention when accessing a random RU to send data.

Each node STA1 to STAn is a transmitting node with regards to receiving AP, and as a consequence, each node has an active RU backoff engine separate from the queue backoff engines, for computing an RU backoff value (OBO) to be used to contend for access to at least one random resource unit splitting a transmission opportunity granted on the communication channel, in order to transmit data stored in either traffic queue AC.

The random allocation procedure in this document comprises, for a node of a plurality of nodes having an active RU backoff value OBO, a first step of determining from the trigger frame the random sub-channels or RUs of the communication medium available for contention, a second step of verifying if the value of the active RU backoff value OBO local to the considered node is not greater than a number of detected-as-available random RUs, and then, in the case of a successful verification, a third step of randomly selecting a random RU among the detected-as-available random RUs for sending data. In case the second step is not verified, a fourth step (instead of the third) is performed in order to decrement the RU backoff value OBO by the number of detected-as-available RUs.

As shown in the figure, some Resource Units may not be used (310*u*) because no node with an RU backoff value OBO less than the number of available random RUs has randomly selected one of these random RUs, whereas some other have collided (as example 310*c*) because two of these nodes have randomly selected the same RU.

The MU Uplink (UL) medium access scheme, including both scheduled RUs and random RUs, proves to be very efficient compared to conventional EDCA access scheme. This is because the number of collisions generated by simultaneous medium access attempts and the overhead due to the medium access are both reduced.

FIG. 4 schematically illustrates a communication device 400 of the radio network 100, configured to implement at least one embodiment of the present invention. The communication device 400 may preferably be a device such as a microcomputer, a workstation or a light portable device. The communication device 400 comprises a communication bus 413 to which there are preferably connected:
  a central processing unit 411, such as a microprocessor, denoted CPU;
  a read only memory 407, denoted ROM, for storing computer programs for implementing the invention;
  a random access memory 412, denoted RAM, for storing the executable code of methods according to embodiments of the invention as well as the registers adapted to record variables and parameters necessary for implementing methods according to embodiments of the invention; and at least one communication interface 402 connected to the radio communication network 100 over which digital data packets or frames or control frames are transmitted, for example a wireless communication network according to the 802.11ax protocol. The frames are written from a FIFO sending memory in RAM 412 to the network interface for transmission or are read from the network interface for reception and writing into a FIFO receiving memory in RAM 412 under the control of a software application running in the CPU 411.

Optionally, the communication device 400 may also include the following components:

a data storage means 404 such as a hard disk, for storing computer programs for implementing methods according to one or more embodiments of the invention;

a disk drive 405 for a disk 406, the disk drive being adapted to read data from the disk 406 or to write data onto said disk;

a screen 409 for displaying decoded data and/or serving as a graphical interface with the user, by means of a keyboard 410 or any other pointing means.

The communication device 400 may be optionally connected to various peripherals, such as for example a digital camera 408, each being connected to an input/output card (not shown) so as to supply data to the communication device 400.

Preferably the communication bus provides communication and interoperability between the various elements included in the communication device 400 or connected to it. The representation of the bus is not limiting and in particular the central processing unit is operable to communicate instructions to any element of the communication device 400 directly or by means of another element of the communication device 400.

The disk 406 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 407, on the hard disk 404 or on a removable digital medium such as for example a disk 406 as described previously. According to an optional variant, the executable code of the programs can be received by means of the communication network 403, via the interface 402, in order to be stored in one of the storage means of the communication device 400, such as the hard disk 404, before being executed.

The central processing unit 411 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 404 or in the read only memory 407, are transferred into the random access memory 412, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

FIG. 5 is a block diagram schematically illustrating the architecture of a communication device or node 400, in particular one of nodes 100-107, adapted to carry out, at least partially, the invention. As illustrated, node 400 comprises an application layer block 501, a MAC layer block 502, and a physical (PHY) layer block 503.

The PHY layer block 503 (here an 802.11 standardized PHY layer) has the task of formatting frames, modulating frames on or demodulating frames from any 20 MHz channel or the composite channel, and thus sending or receiving frames over the radio medium used 100. The frames may be 802.11 frames, for instance medium access trigger frames TF 430 to define resource units in a granted transmission opportunity, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 502 preferably comprises a MAC 802.11 layer 504 implementing conventional 802.11ax MAC operations, and an additional block 505 for carrying out, at least partially, the invention. The MAC layer block 502 may optionally be implemented in software, which software is loaded into RAM 512 and executed by CPU 511.

Preferably, an additional block, referred to NDP Feedback Management module 505 for managing the NDP feedback procedure, implements the part of the invention that regards node 400, i.e. transmitting operations for a source node, receiving operations for a receiving node.

On top of the figure, application layer block 501 runs an application that generates and receives data packets, for example data packets of a video stream. Application layer block 501 represents all the stack layers above MAC layer according to ISO standardization.

Figure 6A:
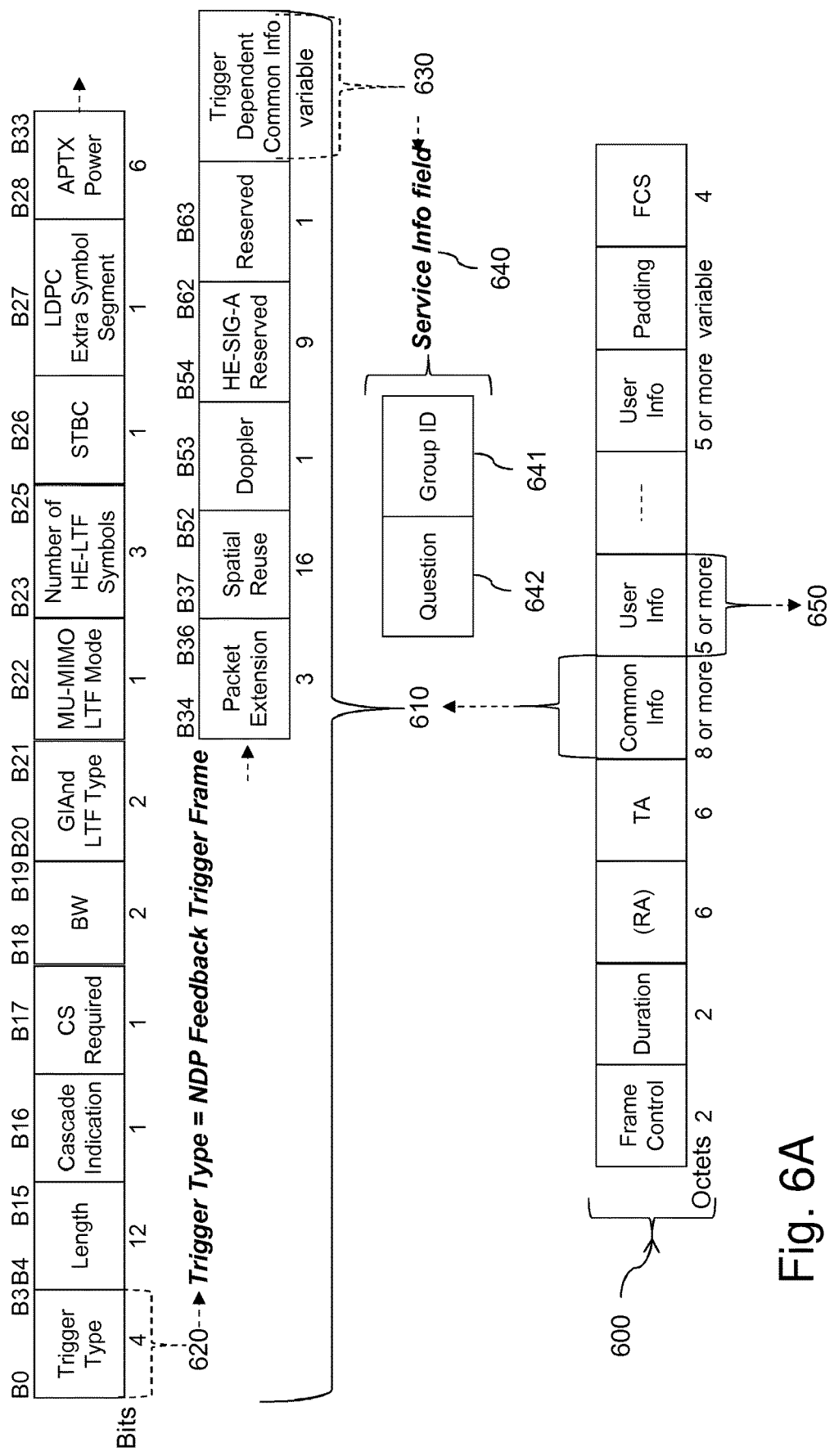
FIGS. 6A and 6B, illustrate the structure of a NDP Feedback trigger frame according to embodiments of the present invention.
Figure 6B:
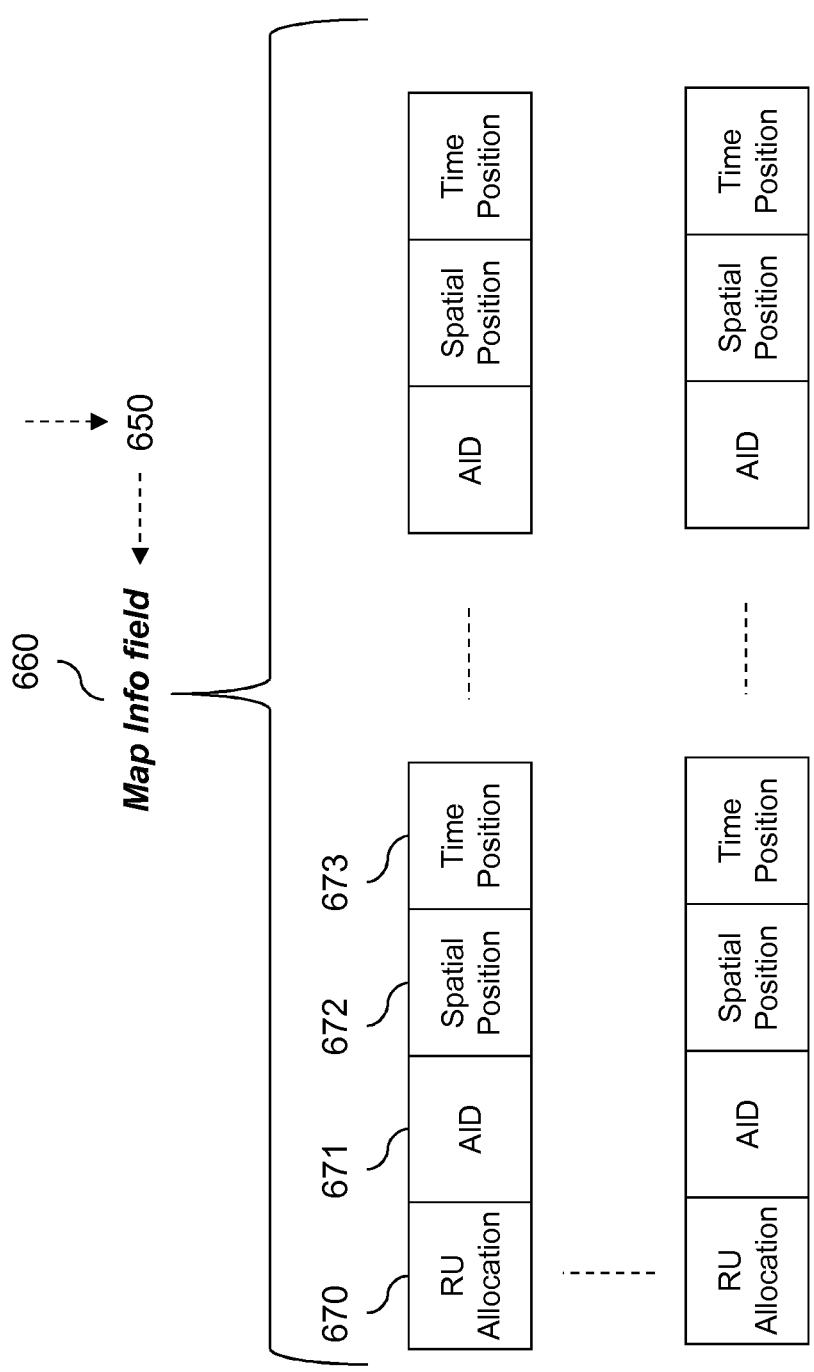

FIGS. 6A and 6B illustrate the structure of a NDP Feedback trigger frame 600 according to embodiments of the present invention.

Embodiments of the present invention provide a trigger frame dedicated to the NDP feedback procedure. It comprises a specific field allowing stations (non-AP nodes) receiving this trigger frame to identify it as being a dedicated NDP feedback trigger frame. Thanks to this specific field, a receiving station knows that a NDP feedback procedure has started and that a NDP feedback is expected by the access point.

Hence, the NDP feedback trigger frame 600 is an additional trigger frame that solicits and allocates resources for Multi-User UpLink transmissions after a SIFS (Short Inter Frame Space) duration for all polled stations. The trigger frame comprises information required by the responding station to send a trigger-based PPDU as mentioned hereafter in the description with reference to FIG. 7.

The NDP feedback trigger frame 600 is a control type frame with a standardized "Frame Control" field and a standardized "Duration" field (802.11ax standard—Draft 1.0—Clause 28.3.16). The "(RA)" field of the trigger frame 600 comprises the broadcast address. The "TA" field value comprises the address of the access point transmitting the trigger frame.

The "Common Info" field 610 is compliant with the corresponding field described in the 802.11ax standard (Draft 1.0—Clause 9.3.1.23.1) but, according to the present invention, the "Trigger Type" subfield 620 and the "Trigger Dependent Common Info" subfield 630 differ from the corresponding subfields of the 802.11ax standard.

According to embodiments, the "Trigger Type" subfield 620 comprises a value specifying that the trigger frame is a dedicated NDP feedback trigger frame. Since in draft 1.0 of the 802.11ax standard, the values 0 to 6 are already taken for other trigger frame type, it is proposed to reserve a different value, for instance 7. Obviously, other values that are not already used for existing trigger frames may be used. Thanks to this new value reserved for the new dedicated NDP feedback trigger frame 600, a receiving station can identify the trigger frame as being a NDP feedback trigger frame, thereby triggering the NDP feedback mechanism.

According to embodiments, the "Trigger Dependent Common Info" subfield 630, which usually provides information depending on the trigger frame type, comprises a "Service Info" subfield 640 that may further comprise a "Question" subfield 641 and a "Group ID" subfield 642.

According to embodiments, the "Question" subfield 641 indicates a question (request) for which the access point requires a feedback response. This question is preferably a closed-ended question. For instance, the closed-ended question may be "do you have data to transmit?" or "do you have enough battery to transmit?" or again "is your temperature higher than the setpoint temperature?".

Therefore, while the NDP feedback procedure as initially drafted in the 802.11ax standard is intended to be used to retrieve resources feedbacks from a high number of stations, embodiments of the present invention allow extending it to the monitoring of the status of multiple sensors of the stations.

Hence, the implementation of the NDP feedback procedure proposed by the present invention allows any question requesting a few bits answer only, to be asked in the NDP feedback trigger frame 600. In this way, the initial usage of the NDP feedback procedure may be advantageously extended to various questions.

According to embodiments, the "GroupID" subfield 642 indicates a group of stations that are polled by the AP. To make it simple, a default value of the GroupID field is defined for the case where all stations of the 802.11 cell are concerned by the NDP feedback trigger frame 600.

Also, a dedicated value can be defined for instance for polling only a subset of stations such as IOT devices. This allows the number of feedback responses to the NDP feedback trigger frame 600 to be limited, thereby saving bandwidth.

The NDP feedback trigger frame 600 also comprises a "User Info" field 650 that indicates the position at which the feedback response is expected by the AP. This is because upon the NDP feedback trigger frame reception, a Multi-User UpLink OFDMA transmission is initiated and such a transmission is performed over a communication channel which is divided into resource units (RU). The "User Info" field 650 thus comprises a Map Info field 660 which defines the position at which the feedback response is expected to be sent by the polled stations in the Multi-User UpLink OFDMA transmission. It should be noted that the term "position" may not refer only to the RU number but can have several dimensions, for instance frequency, time and/or space. Thus, in some embodiments, the position may be tridimensional (frequency, time and space).

For instance, this position may be defined by the following subfields:

the "RU Allocation" subfield 670 that indicates the RU number used by the NDP feedback packet (i.e. NDP feedback response) of the station identified by the AID subfield. The RU Allocation subfield is typically 8 bits in length;

the "AID" subfield 671 that carries the least significant 12 bits of the AID of the station polled by the AP;

the optional "Spatial Position" subfield 672 that specifies the spatial stream number used by the NDP feedback packet of the station identified by the AID subfield;

the optional "Time Position" subfield (673) that specifies the position in the time domain inside the RU used by the NDP feedback packet of the station identified by the AID subfield.

As mentioned, the position can be characterized only by the "RU Allocation" field 670 specifying the RU to be used by the polled station with the AID in the "AID" subfield 671 to send the NDP feedback packet (i.e. NDP feedback response).

It should be noted that when the polled station targeted by the AID indicated in the "AID" subfield 671 does not support transmission with multiple spatial streams (i.e. MIMO technology), the "Spatial Position" subfield 672 of the "Map Info" field 660 is set to 1.

Figure 7:
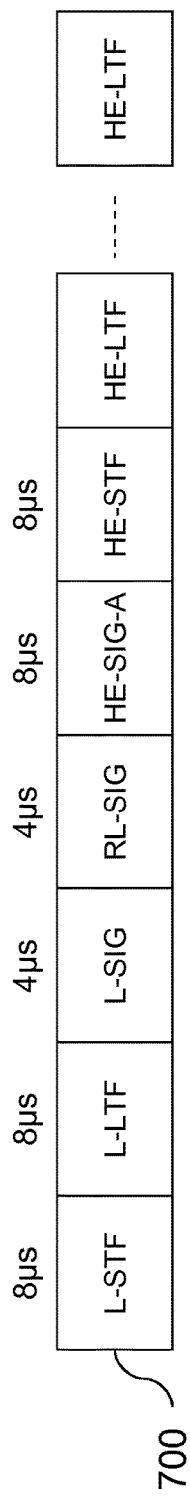
FIG. 7 illustrates the structure of a NDP Feedback packet as known in the art.

FIG. 7 illustrates the structure of a NDP feedback packet, i.e. a NDP feedback response, as known in the art.

As mentioned before, the NDP packet is a single packet with no data payload. This packet is a binary response of the polled station to a trigger frame sent by the access point.

This packet simply uses the PHY preamble to send a binary feedback to the access point. The PHY preamble contains all standard fields and the same PHY preamble as the data packets (such as trigger-based PPDU packet). This preamble is robust. The format is the same as the PHY preamble of the HE trigger-based PPDU packet that is identical to the HE SU PPDU format for the L-STF, L-LTF, L-SIG, RL-SIG, HE-SIG-A fields. The format of the HE SU PPDU packet is described in the clause 28.3.4 of the draft 1.0 of the 802.1 lax standard.

Figure 8:
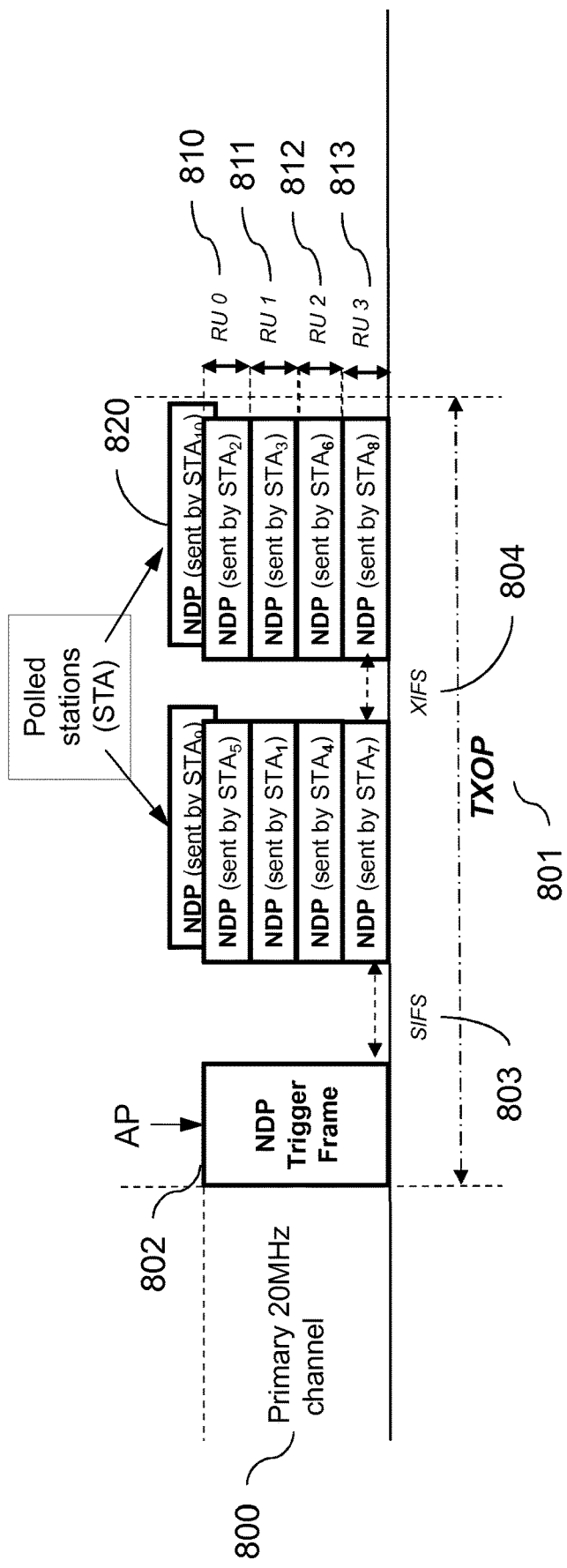
FIG. 8 illustrates a NDP feedback procedure using a dedicated trigger frame according to embodiments of the present invention.

FIG. 8 illustrates a NDP feedback procedure using a dedicated trigger frame according to embodiments of the present invention.

To poll a high number of stations in an efficient manner, the access point sends a NDP feedback trigger frame as described with reference to FIG. 6. In this example, the NDP feedback trigger frame (802) is sent in a 20 MHz primary channel (800). But in another embodiment, the trigger frame 802 can be sent through an extended channel such as 40 MHz, 80 MHz or 160 MHz to extend the number of polled stations.

The NDP feedback trigger frame 802 is sent through the conventional access categories using the standardized EDCA medium access mechanism. As described in the draft 1.0 of the 802.1 lax standard, there is no particular transmission priority for the trigger frame.

According to the present invention, the NDP feedback trigger frame 802 comprises a "Service Info" subfield (not shown) that indicates the targeted group of stations and defines a question to answer for these stations. This targeted group may comprise all the stations of the cell or only a subpart of them, for instance having a specific functionality (e.g. IOT devices).

Also, the NDP feedback trigger frame 802 comprises a "Map Info" subfield (not shown) that defines a position at which the feedback response (i.e. the NDP feedback packet) is expected to be sent by each polled station.

By sending this trigger frame 802, the access point reserves a transmission opportunity 801 (TXOP) divided in multiple RUs 810 (RU 0), 811 (RU 1), 812 (RU 2) and 813 (RU 3).

Upon the reception of the NDP feedback trigger frame 802, the station analyses the "Map Info" field and the "Service Info" field to determine whether it belongs to the group of stations polled by the access point.

If this is the case, after a SIFS duration 803, the station sends a NDP Feedback packet 820 as described with reference to FIG. 7, at the position retrieved from the "Map Info" field of the received NDP feedback trigger frame.

It should be noted that each RU can contain one or more NDP Feedback packets spread in time and/or spatial domain, notably when the position is defined in these additional dimensions.

Figure 9:
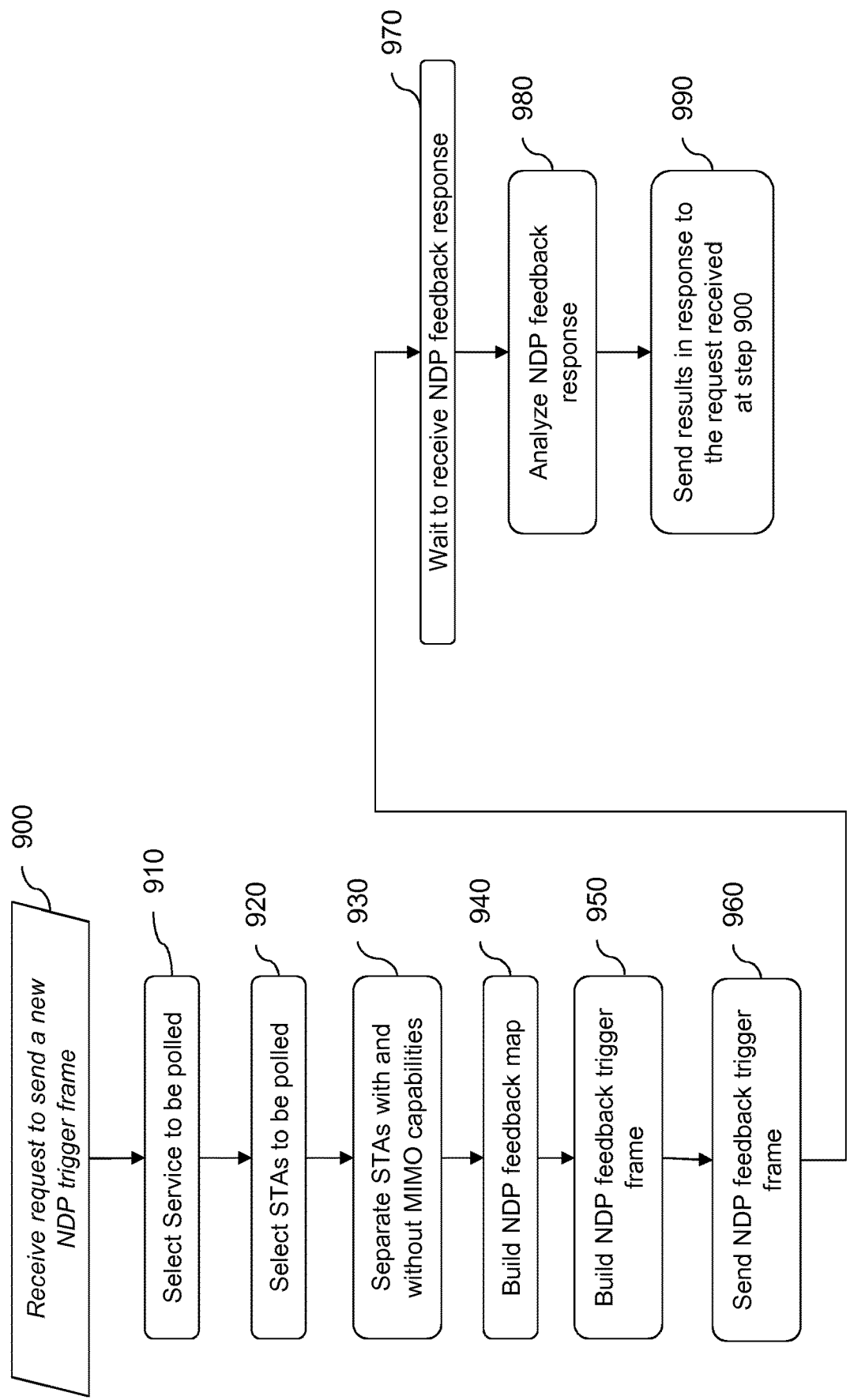
FIG. 9 illustrates, using a flowchart, steps of a communication method performed by an access point (AP) according to embodiments of the present invention when the access point generates and transmits a NDP feedback Trigger frame.

FIG. 9 illustrates, using a flowchart, steps of a communication method performed by an access point (AP) according to embodiments of the present invention when the access point generates and transmits a NDP feedback trigger frame.

At step 900, the AP receives a request to send a new NDP feedback trigger frame. This request may be from the Application layer (501 in FIG. 5) or from the MAC 802.11 layer (504 in FIG. 5). Such a request may be sent periodically or the sending of the request may be triggered by a specific event.

For illustration purposes, the Application Layer may be an application for controlling the temperature of a building. It may thus request the status of stations for a specific temperature level to take a decision about the heating system.

At step 910, the AP selects the appropriate kind of feedback to get, i.e. the question to ask in the "Service Info" field of the NDP feedback trigger frame.

At step 920, the stations to be polled are selected. For instance, all stations attached to the AP may be polled. This may be done by setting the "GroupID" subfield of the NDP feedback trigger frame to a default value. In a variant, only part of the stations may be selected to be polled. In this case, a dedicated value may be indicated in the "GroupID" subfield for this purpose.

At optional step 930, the stations selected at step 920 are separated into two groups: the selected stations having MIMO capabilities are gathered in a first group and the selected stations without MIMO capabilities are gathered in a second group.

At step 940, the AP builds a NDP feedback map defining, for each selected station, a position at which the feedback response (i.e. the NDP feedback packet) is expected to be sent by each polled station. This NDP feedback map will be specified in the "Map Info" field of the NDP feedback trigger frame.

The optional step 930 allows simplifying the building of the NDP feedback map at step 940. In particular, the "Spatial Position" subfield of the "Map Info" field for these stations (without MIMO capabilities) may be set to 1. Then, it may be decided that all the selected stations without MIMO capabilities have to send their NDP feedback response (NDP packet) on a different RU than stations having MIMO capabilities.

At step 950, the AP finally builds the NDP feedback trigger frame.

According to embodiments, the AP inserts a specific value in the "Trigger Type" field (620 in FIG. 6) for identifying the trigger frame as a NDP feedback trigger frame. This allows receiving stations to know that a NDP feedback process is being performed on the communication channel.

The NDP feedback trigger frame is then sent at step 960, for instance using access categories according to the standardized EDCA medium access mechanism.

The AP waits for the NDP feedback responses from the polled stations (step 970) until the end of the transmission opportunity (TXOP).

At step 980, the AP analyses the NDP feedback responses or lack of response.

If the NDP feedback packet is sent by a polled station (i.e. one of the station indicated in the NDP feedback trigger frame), it means that the answer to the closed-ended question indicated in the "Service Info" field of the NDP feedback trigger frame is positive.

Otherwise, if no NDP feedback packet is sent, it means either that the polled station has not received the trigger frame or that the polled station is no more available (battery problem) or that the answer to the closed-ended question indicated in the "Service Info" field of the NDP feedback trigger frame is negative.

In practice, this analysis may be performed using a single energy detection mechanism or a standardized decoding process of the 802.11 PHY layer (503 in FIG. 5).

Finally, at step 990, the AP transmits the results to the Application layer (501 in FIG. 5) or from the MAC 802.11 layer (504 in FIG. 5) in response to the request received at step 900.

Figure 10:
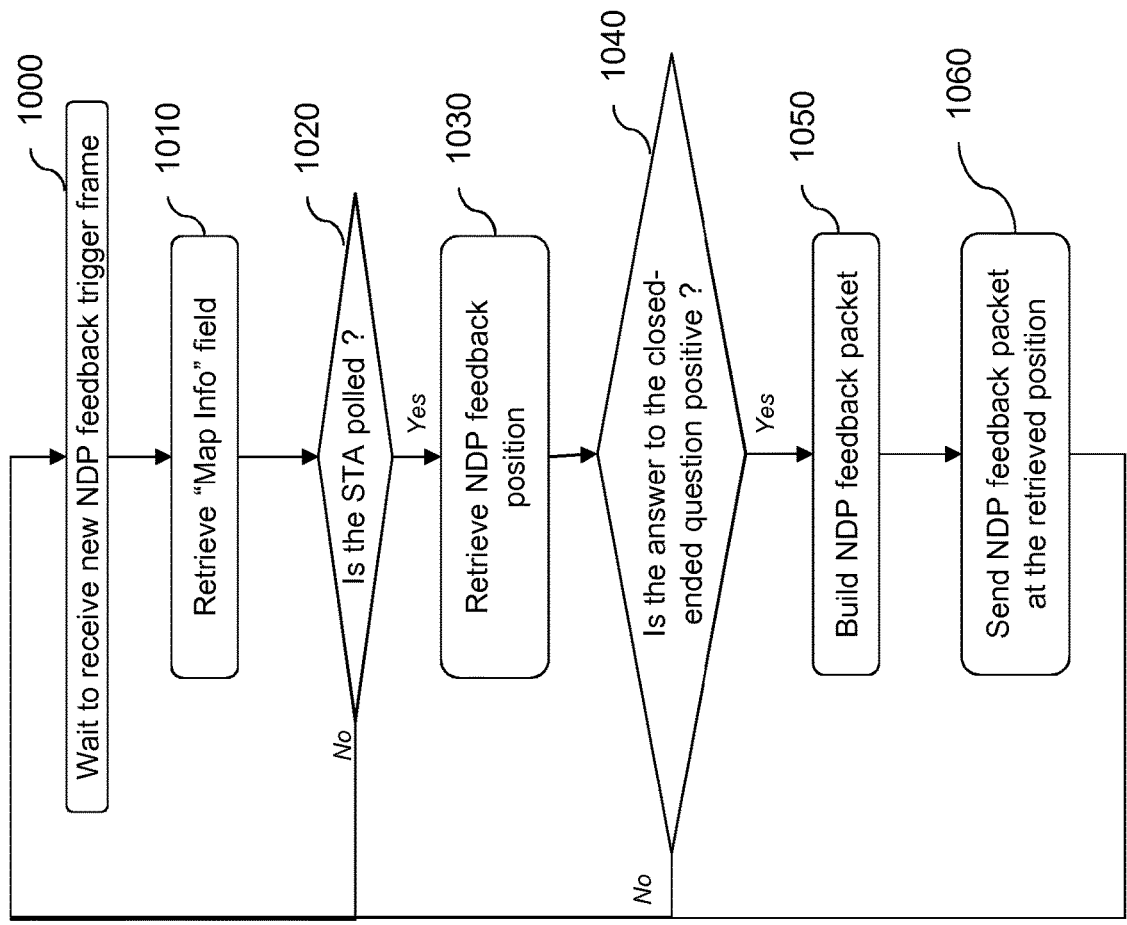
FIG. 10 illustrates, using a flowchart, steps of a communication method performed by a station (non-AP node) STA, according to embodiments of the invention, when the node receives a NDP feedback Trigger frame.

FIG. 10 illustrates, using a flowchart, steps of a communication method performed by a station (non-AP node), according to embodiments of the invention, when the station receives a NDP feedback trigger frame.

The station waits for reception of a NDP feedback trigger frame at step 1000. According to embodiments, when receiving a trigger frame, the station knows that it is a NDP feedback trigger frame thanks to the value of the "Trigger Type" field (620 in FIG. 6). The station thus knows that a NDP feedback process is being performed on the communication channel.

At step 1010, the station retrieves the "Map Info" field of the NDP feedback trigger frame.

At step 1020, the station determines whether its own AID matches with one of the AID subfields of the "Map Info" field. If this is not the case, the process loops back to step 1000 and the station waits to receive a new NDP feedback trigger frame.

Otherwise, if its AID is indicated in the "Map Info" field, the station determines at step 1030, the position at which it is expected to send the NDP feedback response packet. This position is also indicated in the "Map Info" field, as described with reference to FIG. 6.

At step 1040, the station retrieves the question indicated in the "Question" subfield of the "Service Info" field of the NDP feedback trigger frame and determines whether the answer to this question is positive.

If the response to this question is positive, the station builds (step 1050) a NDP feedback packet as described with reference to FIG. 7 and sends it at step 1060 at the position retrieved at step 1030.

Finally, the process loops back to step 1000 and the station waits to receive a new NDP feedback trigger frame.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate. In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless communication network comprising an access point, the method comprising, at the access point:
   accessing a communication channel to send a null data packet, NDP, feedback report poll, NFRP, trigger frame reserving a transmission opportunity on the communication channel and defining tone sets for NDP feedback responses to be sent by stations to the access point;
   wherein the NFRP trigger frame comprises a first field allowing stations to identify the NFRP trigger frame as being a NFRP trigger frame dedicated to initiate collection of the NDP feedback responses from stations during the reserved transmission opportunity; and
   wherein the NFRP trigger frame further comprises a second field indicating a type of the NDP feedback responses which the stations are allowed to provide,
   wherein each of the NDP feedback responses is received by the access point in a packet with no data payload,
   wherein the type of the NDP feedback responses indicated by the second field includes at least a type indicating that resource requests from the stations are being called for.

2. The method according to claim 1, wherein a NDP feedback response is a packet made only of a PHY preamble with no data payload.

3. The method according to claim 1, wherein the type of the NDP feedback responses indicated by the second field further include a type about the status of at least one component of the station.

4. The method according to claim 1, wherein the NFRP trigger frame comprises information indicating a group of stations to be polled by the access point.

5. The method according to claim 1, wherein the NFRP trigger frame comprises a third field specifying the position at which a feedback responsive to the NFRP trigger frame should be sent.

6. The method according to claim 5, wherein the third field comprises at least one station identifier and at least one RU number.

7. The method according to claim 6, wherein the third field also comprises a time position and/or a spatial position.

8. The method according to claim 1, comprising the following steps:
   selecting a service;
   selecting at least one station to be polled about the selected service;
   building the NFRP trigger frame based on the selected service and an identifier of the at least one station to be polled.

9. The method according to claim 8, also comprising:
   building a feedback map for the selected station(s), the feedback map specifying, for each selected station, the position at which a feedback responsive to the NFRP trigger frame should be sent,
   wherein building the NFRP trigger frame is also based on the feedback map.

10. The method according to claim 1, further comprising:
    analyzing the received NDP feedback responses using energy detection.

11. An access point in a wireless communication network, the access point comprising at least one microprocessor configured for carrying out the following step:
    accessing a communication channel to send a null data packet, NDP, feedback report poll, NFRP, trigger frame reserving a transmission opportunity on the communication channel and defining tone sets for NDP feedback responses to be sent by stations to the access point;
    wherein the NFRP trigger frame comprises a first field allowing stations to identify the NFRP trigger frame as being an NFRP trigger frame dedicated to initiate collection of the NDP feedback responses from stations during the reserved transmission opportunity; and
    wherein the NFRP trigger frame further comprises a second field indicating a type of the NDP feedback responses which the stations are allowed to provide,
    wherein each of the NDP feedback responses is received by the access point in a packet with no data payload,
    wherein the type of the NDP feedback responses indicated by the second field includes at least a type indicating that resource requests from the stations are being called for.

12. The access point according to claim 11, wherein the at least one microprocessor is further configured for carrying out a step of:
    analyzing the received NDP feedback responses using energy detection.

* * * * *